United States Patent
Chou et al.

(10) Patent No.: US 8,982,725 B2
(45) Date of Patent: Mar. 17, 2015

(54) METHOD AND APPARATUS FOR COLLECTING AND PROVIDING DIVERSE TRAFFIC INFORMATION IN CELLULAR NETWORKS

(71) Applicant: Mediatek, Inc., Hsin-Chu (TW)

(72) Inventors: Chie-Ming Chou, Taichung (TW); Chia-Chun Hsu, Taipei (TW); Yih-Shen Chen, Hsinchu (TW); Per Johan Mikael Johansson, Kungsangen (SE)

(73) Assignee: Mediatek Inc. (TW)

( * ) Notice: Subject to any disclaimer, the term of this patent is extended or adjusted under 35 U.S.C. 154(b) by 63 days.

(21) Appl. No.: 13/756,809

(22) Filed: Feb. 1, 2013

(65) Prior Publication Data
US 2013/0201851 A1  Aug. 8, 2013

Related U.S. Application Data

(60) Provisional application No. 61/594,453, filed on Feb. 3, 2012.

(51) Int. Cl.
*H04L 12/26* (2006.01)
*H04W 24/02* (2009.01)
(Continued)

(52) U.S. Cl.
CPC .............. *H04W 24/02* (2013.01); *H04W 24/08* (2013.01); *H04W 24/10* (2013.01)
USPC .......................................... 370/252; 370/329

(58) Field of Classification Search
CPC ...... H04W 24/02; H04W 24/08; H04W 24/10
USPC .............. 370/230, 230.1, 231, 232, 233, 234, 370/235, 236, 252–253, 328, 331–333, 346
See application file for complete search history.

(56) References Cited

U.S. PATENT DOCUMENTS 6,438,116 B1 * 8/2002 Corbett ......................... 370/331
7,123,628 B1 * 10/2006 Hwang et al. ................. 370/469
(Continued)

FOREIGN PATENT DOCUMENTS

CN         1472923 A       7/2003
CN       101390310 A      12/2005
(Continued)

OTHER PUBLICATIONS

International Search Report and Written Opinion of International Search Authority for PCT/CN2013/071320 dated May 16, 2013(11 pages).
(Continued)

*Primary Examiner* — Kevin Mew
(74) *Attorney, Agent, or Firm* — Zheng Jin

(57) ABSTRACT

A method of collecting and providing traffic statistics in a cellular network in accordance is proposed. A UE establishes an RRC connection with a base station. The UE starts to collect traffic statistics that comprises a CDF curve or a PDF diagram for packet inter-arrival time. The UE may receive a measurement configuration from the base station for the traffic statistics collection. The UE then reports a representation of the traffic statistics to the base station for RRC reconfiguration. The UE may also receive a reporting request from the base station that specifies a representation format. The representation format includes one or more probability values at corresponding inter-arrival time points, at least one slope of the CDF, one or more steep events in the CDF, or a PDF range.

21 Claims, 12 Drawing Sheets

(51) Int. Cl.
*H04W 24/08* (2009.01)
*H04W 24/10* (2009.01)

(56) References Cited

U.S. PATENT DOCUMENTS

| | | | |
|---|---|---|---|
| 7,283,508 B2 * | 10/2007 | Choi et al. | 370/341 |
| 8,619,680 B2 * | 12/2013 | Morita et al. | 370/328 |
| 8,873,408 B2 * | 10/2014 | Siomina et al. | 370/252 |
| 2005/0163074 A1 * | 7/2005 | Mella et al. | 370/329 |
| 2008/0248756 A1 * | 10/2008 | Yi et al. | 455/67.11 |
| 2009/0054055 A1 * | 2/2009 | Iwamura et al. | 455/423 |
| 2010/0124237 A1 | 5/2010 | Chun et al. | 370/469 |
| 2010/0135208 A1 * | 6/2010 | Ishii et al. | 370/328 |
| 2011/0001958 A1 | 1/2011 | Bridges et al. | 356/4.01 |
| 2011/0269462 A1 | 11/2011 | Sägfors et al. | 455/436 |
| 2011/0269463 A1 | 11/2011 | Wang et al. | 455/436 |
| 2012/0120828 A1 * | 5/2012 | Anderson et al. | 370/252 |
| 2012/0122405 A1 * | 5/2012 | Gerber et al. | 455/67.11 |
| 2012/0207069 A1 | 8/2012 | Xu et al. | 370/311 |
| 2013/0070660 A1 | 3/2013 | Xu | 370/312 |

FOREIGN PATENT DOCUMENTS

| | | |
|---|---|---|
| CN | 101018386 A | 2/2007 |
| CN | 101883327 A | 6/2010 |
| CN | 102231894 A | 7/2011 |
| EP | 1631016 A | 8/2004 |
| WO | WO2011160535 A1 | 6/2010 |

OTHER PUBLICATIONS

International Search Report and Written Opinion of International Search Authority for PCT/CN2013/071324 dated May 16, 2013 (10 pages).

USPTO, Office Action for related U.S. Appl. No. 13/756,838 dated Jun. 11, 2014 (14 pages).

* cited by examiner

ENB-ORIENTED TRAFFIC STATISTICS #1

ENB-ORIENTED TRAFFIC STATISTICS #2

UE-ORIENTED TRAFFIC STATISTICS

COLLECTING AND PROVIDING TRAFFIC STATISTICS

TRIGGERING AND REPORTING TRAFFICS STATISTICS

METHOD AND APPARATUS FOR COLLECTING AND PROVIDING DIVERSE TRAFFIC INFORMATION IN CELLULAR NETWORKS

CROSS REFERENCE TO RELATED APPLICATIONS

This application claims priority under 35 U.S.C. §119 from U.S. Provisional Application No. 61/594,453, entitled "Method and Apparatus for Providing Diverse Traffic Information in Cellular Network," filed on Feb. 3, 2012, the subject matter of which is incorporated herein by reference.

TECHNICAL FIELD

The disclosed embodiments relate generally to mobile communication networks, and, more particularly, to UE providing diverse traffic information to the network and triggering RRC reconfiguration.

BACKGROUND

The exponential growth of mobile subscribers requires substantial increase of network capacity. Currently, network congestion is problematic on many third generation (3G) networks in a number of markets throughout United States and the world. The congested network causes dropped or failed calls, lower data rates and slow response times. Concurrent with this problem of rapid growth of number of users, there has been a rapid uptake of Smartphone subscribers, such as iPhone, Android phone and Blackberry phone users.

Long-term evolution (LTE) system, which offers high peak data rates, low latency and improved system capacity, is adopted by many operators to address the capacity issue. In the LTE system, an evolved universal terrestrial radio access network (E-UTRAN) includes a plurality of evolved Node-Bs (eNBs) communicating with a plurality of mobile stations, referred as user equipment (UE), via LTE-Uu interface. The radio access network further connects with a core network (CN), which includes Mobility Management Entity (MME), Serving Gateway (S-GW), and Packet data Network Gateway (P-GW), to provide end-to-end services. While LTE network increases system capacity, it is projected that LTE network may soon face capacity problems. In both traditional network and LTE, operators always prioritize real-time voice traffic over data traffic. Resources are held in reserve across the network for circuit-switched voice traffic. New wireless data network, such as 3G and LTE network, also optimizes support for large amount of data traffic with long and uninterrupted data sessions (video conferencing, FTP, etc.) with the focus on bandwidth and throughput.

Such design, however, does not work well for applications with short, infrequent data sessions, such as chatty applications and keep alive messages. Many common applications such as news, weather, and social networking, periodically connect and disconnect to/from the network for updates. These applications contain small amount of user data while still require a large amount of signaling traffic to establish and tear down the session. It is estimated that with the growing number of Smartphone applications over the network, the signaling overhead outpaces the data traffic by 30% to 50%. In addition to rapidly increased data and signaling volume that puts pressure on LTE-Uu interface, the amount of signaling to the Core Network is also a major concern of the operators. Therefore, using data network efficiently is essential to improve network capacity.

Besides improving network efficiency, maintaining quality of service (QoS) is an important area for the successful growth of wireless networks. Applications over the wireless network have various requirements in terms of delay, bandwidth and error rate that they desire for optimal performance or user experience. In light of the exploding growth of the amount of mobile data and various mobile applications, coupled with the wide adoption of LTE by wireless network operators, it becomes important to find ways to improve network efficiency and to maintain the QoS of various applications.

Overall, the problem of controlling and optimizing network signaling, radio resource usage and UE battery consumption for typical smart phones is complex. The smart phone traffic behavior is diverse and different from traditional traffic. Consequently, DRX and RRC state transition may not work as well under diverse data application (DDA) environment. Signaling overhead may increase (both RAN and CN), UE power consumption may increase, and QoS may degrade. One possible solution is for UE to provide additional assistant information to eNodeB for facilitating related configurations. The assistant information, like speed, traffic pattern, battery usage, etc. is important for efficient configuration but difficult for eNodeB to observe.

It is an objective of the current invention to provide a method for UE to collect traffic statistics and to represent the traffic statistics in an efficient and meaningful way to the network for improved UE parameter configuration.

SUMMARY

In one novel aspect, a method of collecting and providing traffic statistics in a cellular network in accordance is proposed. A UE establishes an RRC connection with a base station. The UE starts to collect traffic statistics that comprises a CDF curve or a PDF diagram for packet inter-arrival time. The UE may receive a measurement configuration from the base station for the traffic statistics collection. The UE then reports a representation of the traffic statistics to the base station for RRC reconfiguration. The UE may also receive a reporting request from the base station that specifies a representation format. The representation format includes one or more probability values at corresponding inter-arrival time points, at least one slope of the CDF, one or more steep events in the CDF, or a PDF range. In one example, the base station assigns at least one threshold to identify the steep events.

In another novel aspect, a method of triggering and reporting traffic statistics in a cellular network is proposed. A UE establishes an RRC connection with a base station. The UE collects traffic statistics upon detecting a trigger event. The traffic statistics comprises packet inter-arrival time. The trigger event may be detected by the UE or by the base station. The UE then determines a representation of the traffic statistics and report the result to the base station. The report may be triggered by the UE or by the base station based on another trigger event. Upon receiving the traffic statistics, the base station determines RRC reconfiguration parameters. In one example, DRX timer values are determined based on intra-burst packet inter-arrival time. In another example, RRC release timer is determined based on inter-burst packet inter-arrival time.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
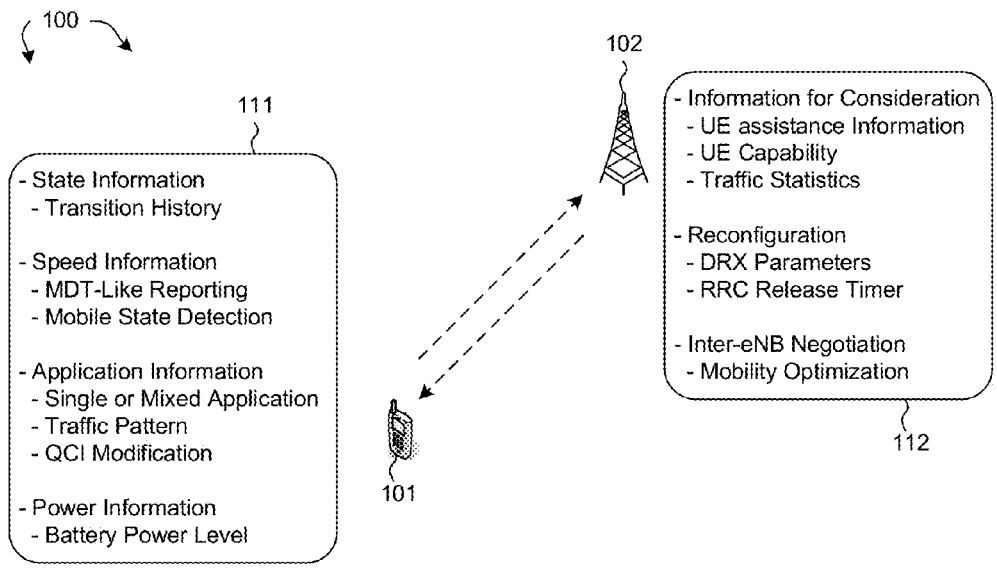
FIG. 1 illustrates a method of UE providing sufficient information to eNodeB in a wireless communication system in accordance with one novel aspect.

FIG. 1 illustrates a method of UE 101 providing sufficient information to eNodeB 102 in a wireless communication system 100 in accordance with one novel aspect. Wireless communication system 100 comprises a user equipment UE 101 and a base station eNodeB 102. In mobile communication, Discontinuous Reception (DRX) is a method used to reduce power consumption and thereby conserving battery of the mobile device. DRX is used to control UE Physical Downlink Control Channel (PDCCH) monitoring activity. When a DRX cycle is configured, the active time is determined by several DRX parameters and timers. Another DRX cycle, i.e., a short DRX cycle may also be assigned by eNodeB to UE. In LTE, DRX is controlled by the radio resource control (RRC) protocol via RRC_signaling. LTE has also defined two RRC states, RRC_CONNECTED state and RRC_IDLE state. The Core Network (CN) can wake up a UE from RRC_IDLE state to RRC_CONNECTED state by sending paging message, or UE may wake up itself if an uplink packet arrives at its buffer. Only the core network (CN) can release the RRC connection. An RRC release timer on eNodeB may be initiated if there is no packet transmission between UE and eNodeB and eNodeB will send UE to RRC_IDLE when timer expires.

In one embodiment, UE 101 may be a Smartphone (e.g., iPhone, Android phone, Windows phone and Blackberry phone) running certain Smartphone applications. The Smartphone traffic behavior is diverse and different from traditional traffic (e.g., FTP data or voice) in cellular networks. Consequently, DRX and RRC state transition may not work as well under diverse data application (DDA) environment. One possible solution is for UE 101 to provide additional assistant information (e.g., depicted by box 111) to eNodeB 102 for facilitating related configurations (e.g., depicted by box 112). As illustrated in FIG. 1, the assistant information contains 1) UE state information such as transition history, 2) UE speed information such as MDT-like reporting and mobile state detection, 3) UE application information such as single or mixed application, traffic pattern, and QCI modification, and 4) UE power information such as battery power level. Based on the assistant information, UE capability, and traffic statistics, the network can perform RRC reconfiguration (DRX parameters and RRC release timer) and mobility optimization. More specifically, the goal of the present invention is to adapt DRX configuration and to make good decision on RRC transition based on traffic statistics of the UE including Smartphone or any other kinds of wireless communication devices.

Figure 2:
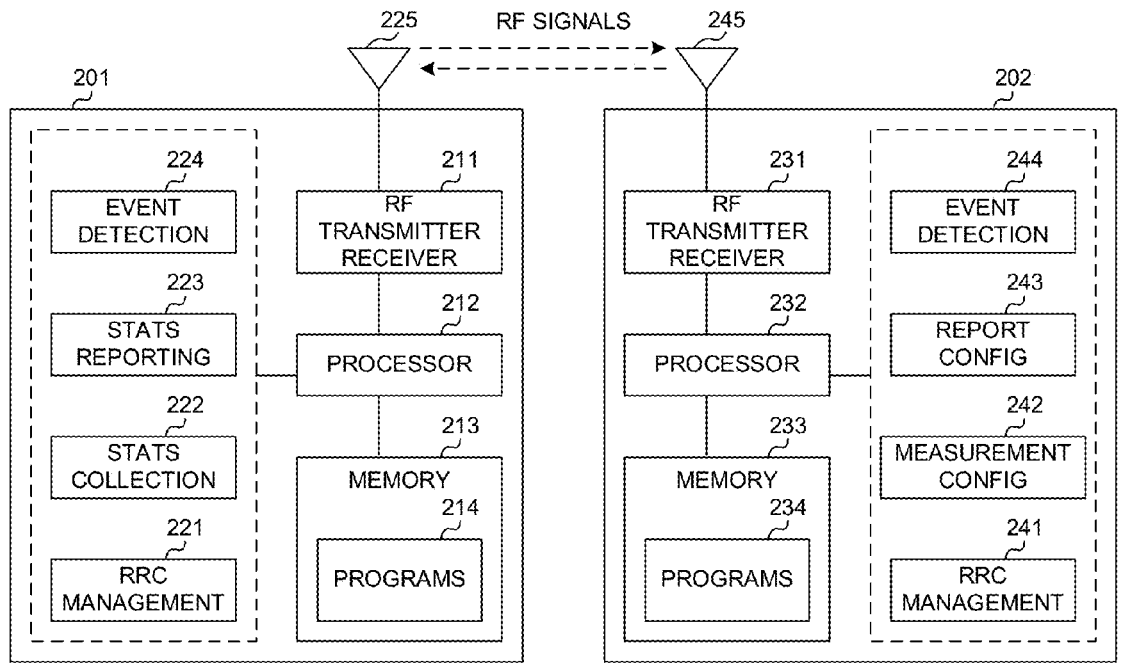
FIG. 2 is a simplified block diagram of a UE and an eNodeB that support certain embodiments of the present invention.

FIG. 2 is a simplified block diagram of a UE 201 and an eNodeB 202 that support certain embodiments of the present invention. Antenna 225 transmits and receives RF signals. RF transceiver module 211, coupled with antenna 225, receives RF signals from the antenna, converts them to baseband signals and sends them to processor 212. RF transceiver 211 also converts received baseband signals from the processor 212, converts them to RF signals, and sends out to antenna 225. Processor 212 processes the received baseband signals and invokes different functional modules to perform features in UE 201. Memory 213 stores program instructions and data 214 to control the operations of UE 201.

FIG. 2 also shows four functional modules 221, 222, 223 and 224, which carry out embodiments of the present invention. RRC management module 221 manages RRC states, performs RRC connection setup, and maintains RRC connection. Stats collection module 222 collects traffic statistics. Stats reporting module 223 determines a representation of the collected statistics and reports the representation to the network. Event detection module 224 detects some predefined trigger events. UE 201 triggers corresponding actions based on the trigger events detected by event detection module 224.

Similar configuration exists in eNodeB 202 where an antenna 245 transmits and receives RF signals. RF transceiver module 231, coupled with antenna 245, receives RF signals from the antenna, converts them to baseband signals and sends them to a processor 232. RF transceiver 231 also converts received baseband signals from the processor 232, converts them to RF signals, and sends out to antenna 245. Processor 232 processes the received baseband signals and invokes different functional modules to perform features in eNodeB 202. Memory 233 stores program instructions and data 234 to control the operations of eNodeB 202.

eNodeB 202 also includes several functional modules to carry out embodiments of the invention. RRC management module 241 manages RRC states, performs RRC connection setup, and maintains RRC connection. Measurement configuration module 242 configures measurement objects for statistics collection. Report configuration module 243 provides configuration for statistics reporting. Event detection module 244 detects some predefined trigger events. eNodeB 202 triggers corresponding actions based on the trigger events detected by event detection module 244. The different functional modules can be implemented by software, firmware, hardware, or any combination thereof. For example, the function modules, when executed by the processors 212 and 232 (e.g., via executing program codes 214 and 234), allow UE 201 to collect and provide traffic statistics to eNodeB 202, and allow eNodeB 202 to configure the traffic statistics collection and reporting, and perform RRC reconfiguration based on the reported traffic statistics accordingly.

Figure 3:
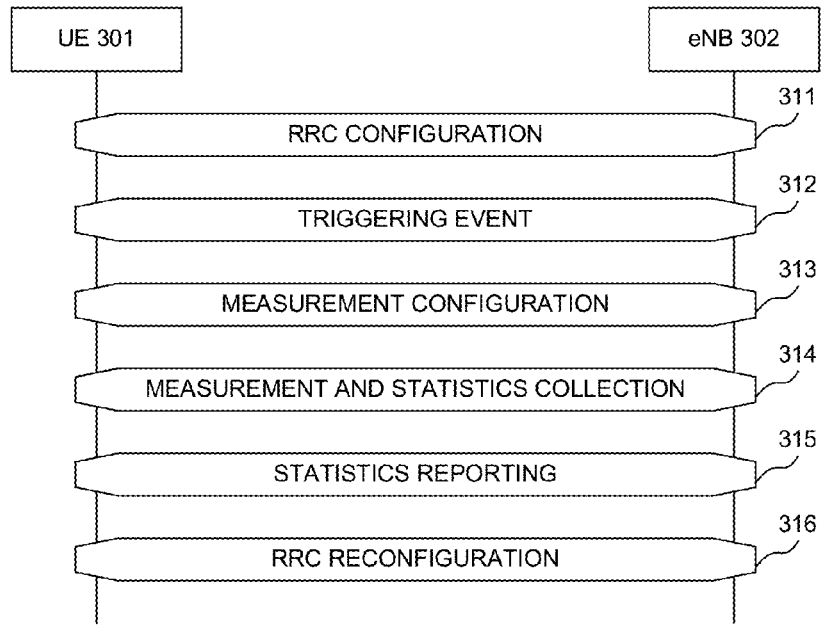
FIG. 3 illustrates an overall flow and main functionalities of UE and eNodeB in accordance with one novel aspect.

FIG. 3 illustrates an overall flow and main functionalities of a UE 301 and an eNodeB 302 in accordance with one novel aspect. In step 311, UE 301 and eNodeB 302 establish an RRC connection with certain RRC configuration (DRX parameters and RRC release timer). In step 312, UE 301 or eNodeB 302 detects a trigger event, which triggers subsequent traffic statistics collection and reporting. If eNodeB 302 detects the trigger event, then in step 313, eNodeB 302 transmits measurement configuration to UE 301. Alternatively, if UE 301 detects the trigger event, then in step 313, UE 301 may self-configure the measurement. In step 314, UE 301 starts to perform measurements and collect statistics accordingly. In step 315, UE 301 reports the collected traffic statistics to eNodeB 302. The statistics reporting may be triggered and configured by eNodeB 302, or initiated by UE 301 itself. In step 316, eNodeB 302 performs RRC reconfiguration for UE 301 based on the reported traffic statistics.

Figure 4:
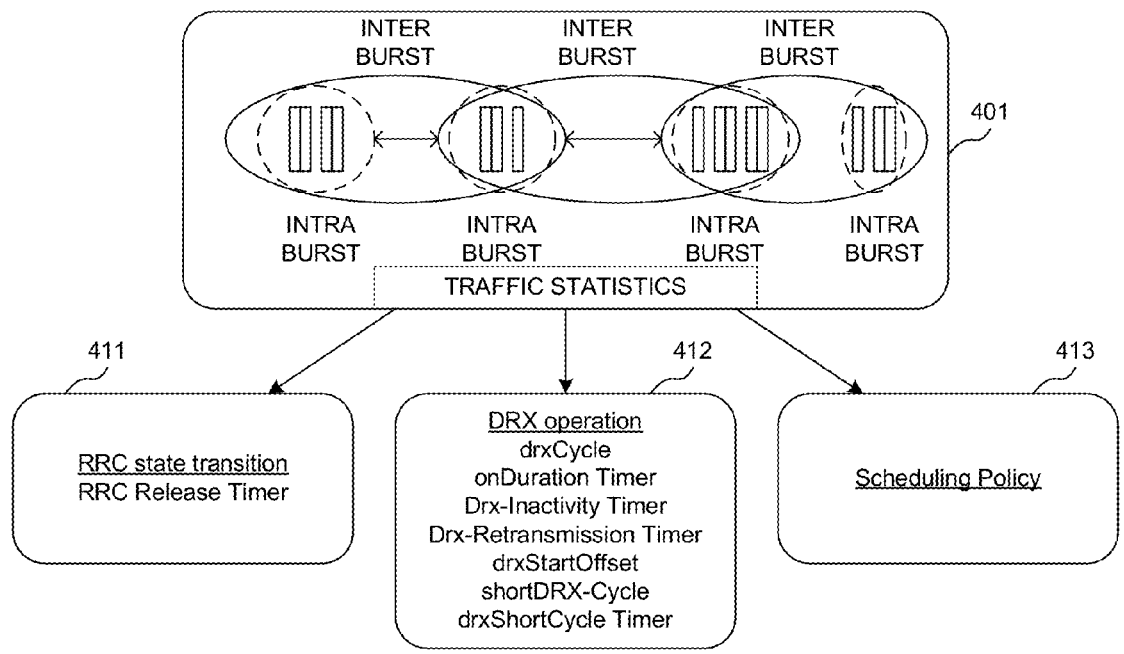
FIG. 4 illustrates traffic statistics can be used by network for determining RRC reconfiguration parameters.

FIG. 4 illustrates traffic statistics can be used by network for determining RRC reconfiguration parameters. In general, traffic statistics can help eNodeB to make proper decision on RRC configuration. As illustrated in FIG. 4, packet inter-arrival time is useful information. Box 401 depicts two types of packet bursts. A first type is called intra-burst. Intra-burst means a lot of packets have similar packet inter-arrival time, and this time value is smaller than a scale. A second type is called inter-burst. Inter-burst means many bursts have similar inter-arrival time (the packet inter-arrival time between last packet in previous burst and the first packet in the following burst), and this time value is larger than a scale. The packet inter-arrival time of intra-burst and inter-burst can be used to determine many UE-specific parameters in the area of RRC state transition (box 411), DRX operation (box 412), and Scheduling policy (box 413). For example, DrxInactivitytimer may be determined by intra-burst packet inter-arrival time, DrxshortCycletimer may be determined by inter-burst packet inter-arrival time, and RRC release timer may be determined based on inter-burst packet inter-arrival time and a trade-off between RRC transition and power consumption.

Figure 5:
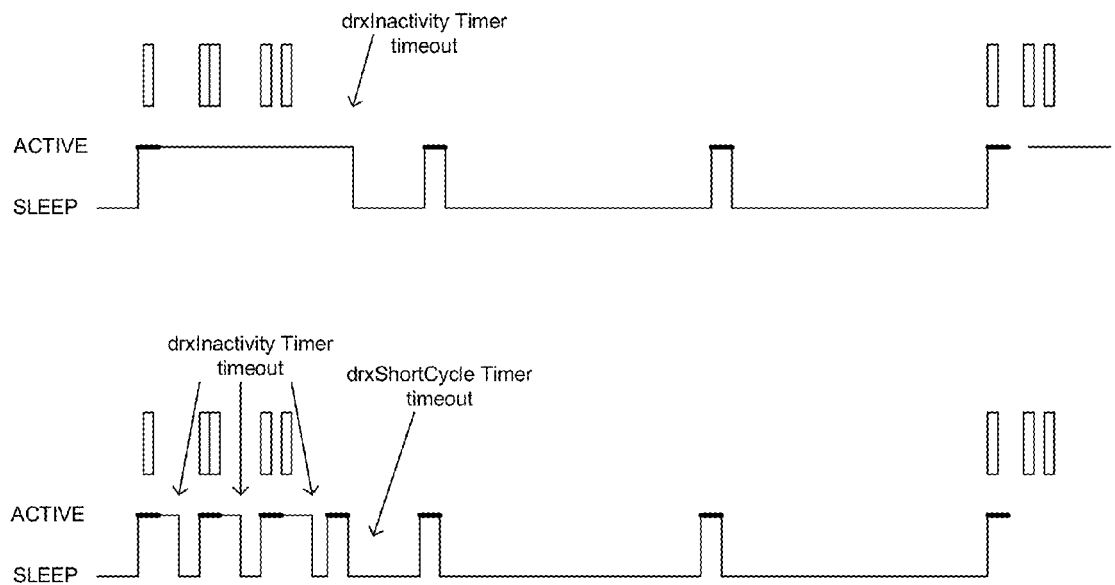
FIG. 5 illustrates one example of determining DRX parameters based on packet inter-arrival time.

FIG. 5 illustrates one example of determining DRX parameters based on packet inter-arrival time. In the top diagram of FIG. 5, long DRX cycle is used. It can be seen that if drxInactivity Timer is set shorter than part of a burst, then the burst may be delayed until the next on-duration of a DRX cycle. Therefore, intra-burst packet inter-arrival time should be used to set drxInactivity Timer. In the bottom diagram of FIG. 5, short DRX cycle is used. It can be seen that both the settings of DRX short cycle and drxShortCycle Timer should be based on intra-burst packet inter-arrival time.

Figure 6:
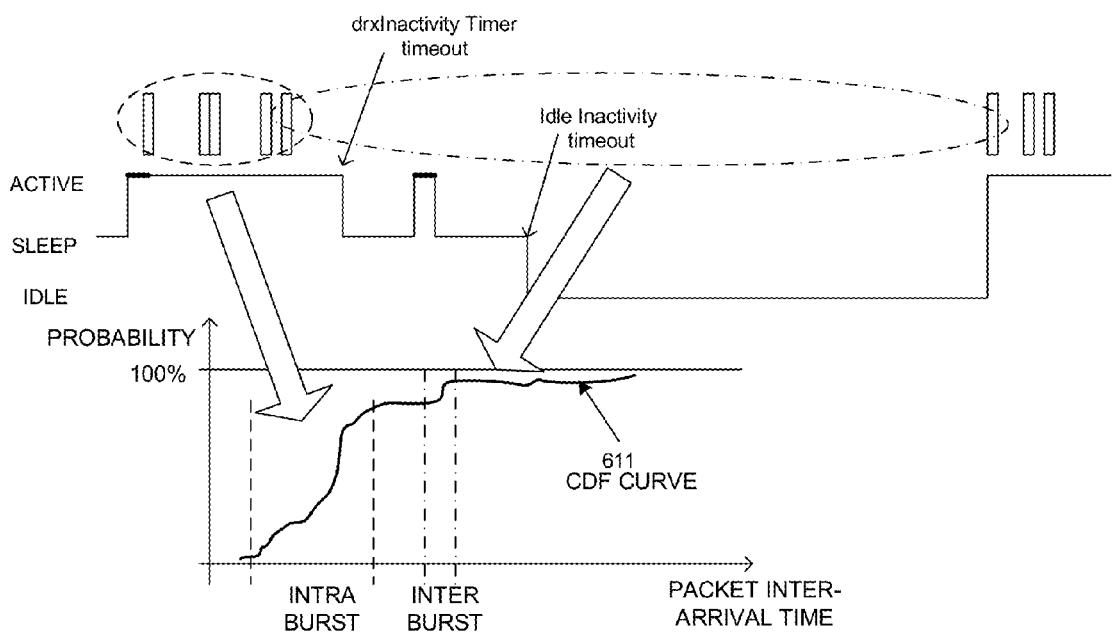
FIG. 6 illustrates one example of determining RRC state transition based on packet inter-arrival time.

FIG. 6 illustrates one example of determining RRC state transition based on packet inter-arrival time. RRC state transition between RRC_CONNECTED and RRC_IDLE may increase signaling overhead, thus should not be triggered unless it is likely that UE can stay in IDLE for a while. Therefore, whether to trigger IDLE transition or not should be dependent on expected packet inter-arrival time when traffic is not in a burst, i.e., based on inter-burst packet inter-arrival time. The intra-burst packet inter-arrival time and the inter-burst packet inter-arrival time are reflected in a cumulative distribution function (CDF) curve 611 in FIG. 6.

To acquire packet inter-arrival time statistics, three issues need to be taken into account. First, how to calculate the timing of packet inter-arrival time needs to be defined, i.e., what is the definition of arrival time and its reference timing. Second, the approaches and embodiments to acquire packet inter-arrival statistics need to be specified. Third, further considerations and operations need to be addressed when UE operates with handover (HO), carrier aggregation (CA), multi-RAT, and cooperative multiple point (CoMP) transmission. Each issue is now discussed below with details.

Figure 7:
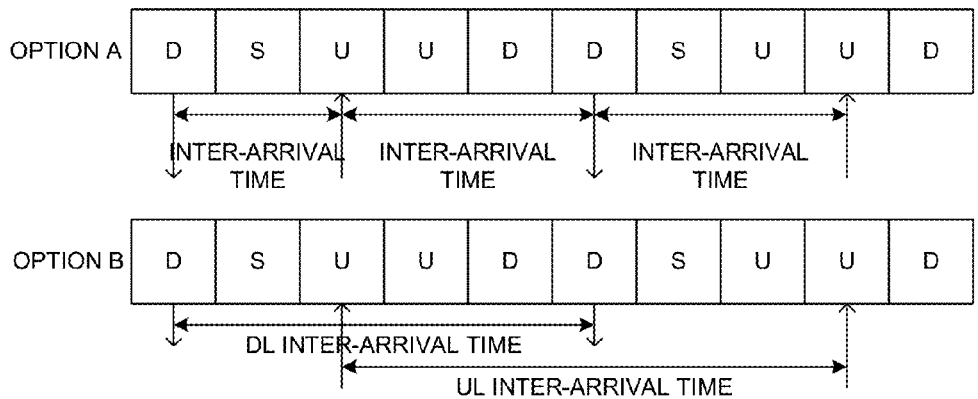
FIG. 7 illustrates two embodiments of defining packet inter-arrival time.

FIG. 7 illustrates two embodiments of defining packet inter-arrival time. From UE point of view, the reference timing for downlink (DL) arrivals are defined as the frame timing of DL packet transmission on PDSCH, and the reference timing for uplink (UL) arrivals are defined as the frame timing of UL packet on L2 buffer. The timing unit is microsecond (integer value). Feedback information (ACK/NACK, CSI) and retransmission packets are excluded during acquisition. Two options can be used on determining packet inter-arrival time.

In a first Option A, DL and UL packets are mixed when determining packet inter-arrival time, as illustrated in the top diagram of FIG. 7. UE does not categorize the arrival packets as DL or UL during acquisition, and inter-arrival time is the time different between two neighboring packets. Only one statistics is generated under Option A. Option A is simple and thus a preferred embodiment. In addition, because the decision on RRC transition and DRX configuration are jointly applied for DL and UL transmission, separating DL and UL traffic is therefore unnecessary.

In a second Option B, DL and UL packets are separated when determining packet inter-arrival time, as illustrated in the bottom diagram of FIG. 7. UE distinguishes the arrival packets, and inter-arrival time is the time difference between two neighboring DL packets or two neighboring UL packets. Two separate statistics for DL and UL are generated under Option B. The network may request one of the results or both. Option B can provide additional information for other purposes (e.g., UL packet inter-arrival time information can be used for configuring SR period). However, separate DL and UL packet inter-arrival statistics may be influenced by different TDD configuration, thus provides no meaning for RRC transition and DRX configuration.

Figure 8:
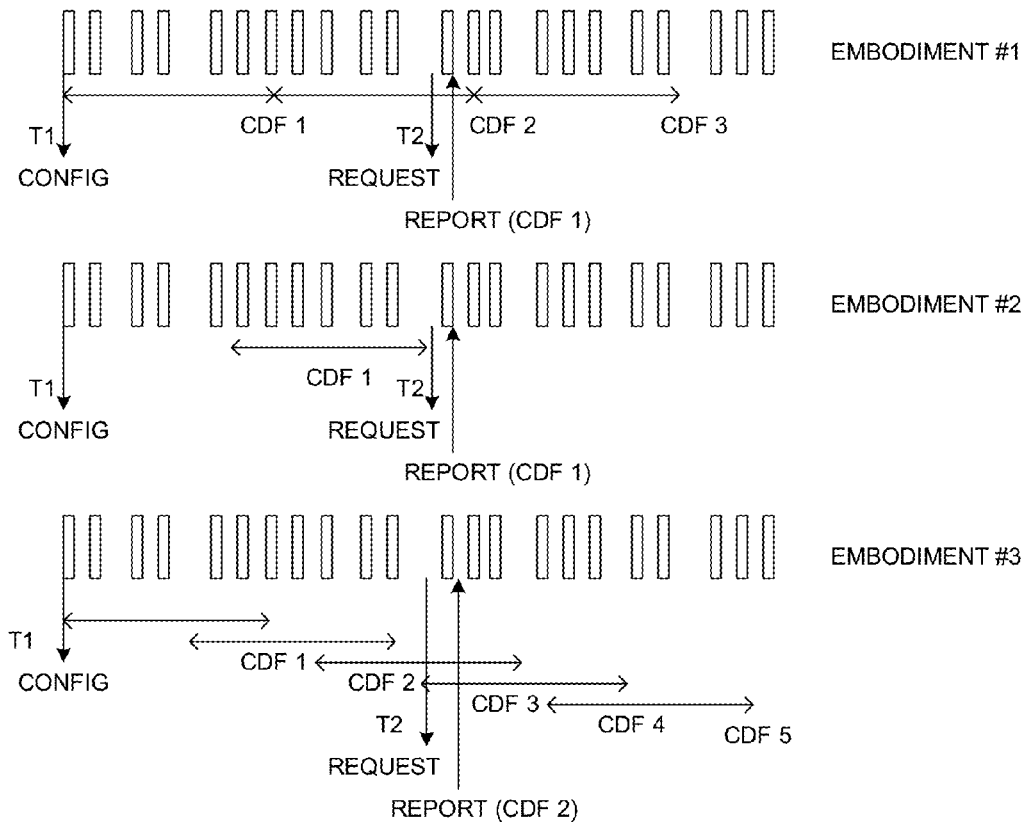
FIG. 8 illustrates three embodiments of acquiring packet inter-arrival time.

FIG. 8 illustrates three embodiments of acquiring packet inter-arrival time. When acquiring statistics, UE may use buffer to store collection. Because buffer size is limited and fixed, UE needs to remove oldest data based on FIFO if buffer expires. The statistics acquisition consists of two steps. The first step is to collect inter-arrival time for each packet, and the second step is to generate statistics result (e.g., CDF) within a time period based on the collection.

In a first embodiment #1, as illustrated in the top diagram of FIG. 8, statistics is generated within a duration, and the previous statistics is flushed at the next duration. At time T1, UE receives a measurement configuration for stats collection. UE then starts to acquire a first statistics result CDF1 when the first duration is finished and stores the result. If UE has not received any request, then UE starts to acquire a second statistics result CDF2 when the second duration is finished and stores the result, while flushing the previous result CDF1, and so on so forth. The duration may be configured by eNodeB or may be a UE-implemented value depending on UE buffer size. When reporting, UE only reports the last result after a complete duration. Alternatively, eNB may designate the results with regard to indicated duration shall be reported. For example, if the UE receives a request at time T2, then UE reports CDF1. While Embodiment #1 is simple, the CDF results are independent and may have problems if the period is not well defined (e.g., the neighboring CDF may change a lot and confuse eNodeB). In addition, the CDF results may not be able to show real-time condition if the period is long.

In a second embodiment #2, as illustrated in the middle diagram of FIG. 8, UE generates statistics upon eNodeB request. At time T1, UE receives a measurement configuration for stats collection. UE starts to acquire a statistics result upon receiving a request from eNodeB. Otherwise, UE does not generate any statistics (just collection). The collection duration may be configured by eNodeB or may be a UE-implemented value depending on UE buffer size. For example, when UE receives a request at time T2, UE generates a statistics result CDF1 for the previously completed collection duration and reports CDF1 to eNodeB. Embodiment #2 can reflect real-time condition and is a preferred embodiment.

In a third embodiment #3, as illustrated in the bottom diagram of FIG. 8, UE generates statistics within a "sliding window". At time T1, UE receives a measurement configuration for stats collection. UE starts to acquire a statistics result when a window/duration is finished and stores the result and continue the next window/duration based on a sliding size. UE does not flush all statistics but only flush the old data that are out of the new window. The window size and sliding size may be configured by eNodeB. For example, at time T2, UE receives a request and reports the statistics result CDF2 for the current sliding window. Embodiment #3 is a hybrid version based on Embodiment #1 and Embodiment #2. Embodiment #3 can be controlled by eNodeB, but the UE calculation overhead is the highest.

Note that the collection duration for Embodiments #1, #2, and #3 may have impacts on the statistics results, depending on different purposes. In general, eNodeB may set a specific duration to capture traffic condition with respect to a specific application, may set sufficient long duration to capture all traffic variations no matter what application is running, or may set the duration based on a previous statistics result. Considering that each eNodeB may have different requirements and definitions on how long the duration is enough, it is reasonable for eNodeB to specify the duration.

When UE performs packet inter-arrival time statistics acquisition, it is possible that a handover (HO) operation occurs at the same time. Various options may be used by the UE to handle concurrent HO operation. In a first option, UE continues the statistics acquisition. Since there is no arrival packets during HO, HO execution time would be taken into account for packet inter-arrival. This is a simple UE behavior, although HO failure may force acquisition result to be inaccurate. In a second option, UE suspends statistics acquisition during HO. HO execution time refers to the timing difference between receiving RRC Connection Reconfiguration include mobility Info and sending RRC Connection Reconfiguration Complete. In addition, if HO failure is happened, UE may also remove that period during statistics. This option can provide accurate and prompt traffic statistics to target eNodeB after HO and is a preferred option. In a third option, UE stops the statistics acquisition. This is a simple UE behavior. However, there is no benefit to release the acquisition, and it increases signaling overhead when new initiation for stats collection is required at target eNodeB. From eNodeB perspective, source eNodeB exchanges related information with target eNodeB if option 1 or 2 is applied. The information includes configured parameters for traffic statistics, RRC configurations and previous statistics results. Target eNodeB may reply its preferred configuration to source eNodeB and make reconfiguration during HO preparation.

In LTE systems, carrier aggregation (CA) is sometimes applied for more efficient bandwidth usage. It is possible to provide DDA with CA. This is because cross-carrier scheduling for DDA transmission may be used if there is interference problems or loading issues on PCELL, and the traffic volume may suddenly become big for DDA (e.g., run YouTube on Facebook). Three options can be used for determining packet inter-arrival time during CA. Under Option A, UE performs acquisition per CC and generates respective statistics result for each CC. The de-activation of CC may not terminate the collection, and eNodeB can request at least one specific CC traffic statistics. Option A can be used to provide scheduling information on CCs (e.g., fairness on CC usage, long inter-arrival indicates less usage on that CC as compared to short inter-arrival on other CCs). However, since unified DRX configurations are applied for all CCs, such separate acquisition is meaningless for DRX.

Under Option B, UE performs acquisition on per UE basis. No matter what CC packet is arrived on, it does not make any difference for the acquisition. If multiple packets arrived on different CCs at the same time, then UE would treat those packets as "aggregated packet", no packet inter-arrival time would be logged and UE may further record there is one packet at that time with aggregated size. (It is noted that DL packet and UL packet are separately aggregated and recorded as two packets at the time.) Option B is preferred because it provides traffic statistics acquisition that is transparent to CA and the result can help to make unified decisions on DRX.

Under Option C, UE performs acquisition only on PCELL even there are packets arrive at other SCELLS. Since packets may be scheduled at other CCs, the result on PCELL would not be sufficient to reflect the traffic information under Option C.

When UE performs multi-RAT transmission, the UE may receive or transmit packets through different RAT. DRX is one of the TDM solutions for in-device co-existence (IDC). For example, other RATs such as Bluetooth (BT) or WiFi are activated on DRX opportunity. As a result, the BT/WiFi packet inter-arrival time may have relationship between DRX opportunities. It is suggested to separate the acquisition for different RATs. Otherwise, eNodeB may be confused by the results and unable to assign sufficient DRX opportunity for other RAT transmission.

When UE performs CoMP, Dynamic Point Selection (DPS) is one of the transmission modes in CoMP. UE may receive traffic at different point at different time with very quick switching. If UE is configured with different DRX configuration at different point, then it is reasonable to separate the acquisition from different points. DRX can be used for DPS where one cell transmits its packet on DRX ON and the other cell transmits its packet on DRX OFF (that time would be a DRX ON for that cell). Therefore, the DRX cycle would be determined based on the union of two cell's traffic statistics.

The acquisition of UE traffic statistics can be configured by eNodeB, or can be initiated by UE itself automatically, based on certain triggering condition. If configured by eNodeB, then eNodeB sends a command to UE. The commands tells UE when and how to acquire the traffic statistics. For example, the command signaling would be a new information element (IE) (e.g., traffic measurement) via RRC signaling.

Figure 9:
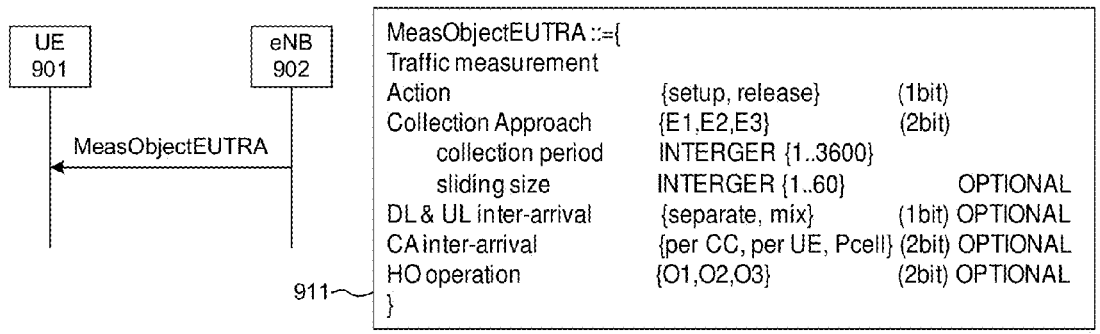
FIG. 9 illustrates one embodiment of measurement configuration for packet inter-arrival time.

FIG. 9 illustrates one embodiment of measurement configuration for packet inter-arrival time. In the example of FIG. 9, eNB 902 sends a measurement configuration command MeasobjectEUTRA to UE 901. For example, the command as depicted by box 911 instructs UE 901 whether to setup or release traffic measurement action, what is the acquisition approach and associated collection period and sliding size, how inter-arrival time is defined with respect to DL and UL packets, and how to handle collection under CA and HO, etc. Based on the measurement configuration command, UE 901 can start/stop traffic measurements for acquiring packet inter-arrival time statistics accordingly.

For eNB-oriented traffic statistics, eNB first configures a measurement to command UE starting collect information and perform statistics. Consequently, eNB may request UE to report the result or the UE report the result according to configurations. For UE-oriented traffic statistics, UE may automatically trigger traffic statistics based on its decision and report the results if reporting event is satisfied. The UE may perform capability negotiation with eNB to indicate the possibility of sudden traffic statistics reporting.

Figure 10:
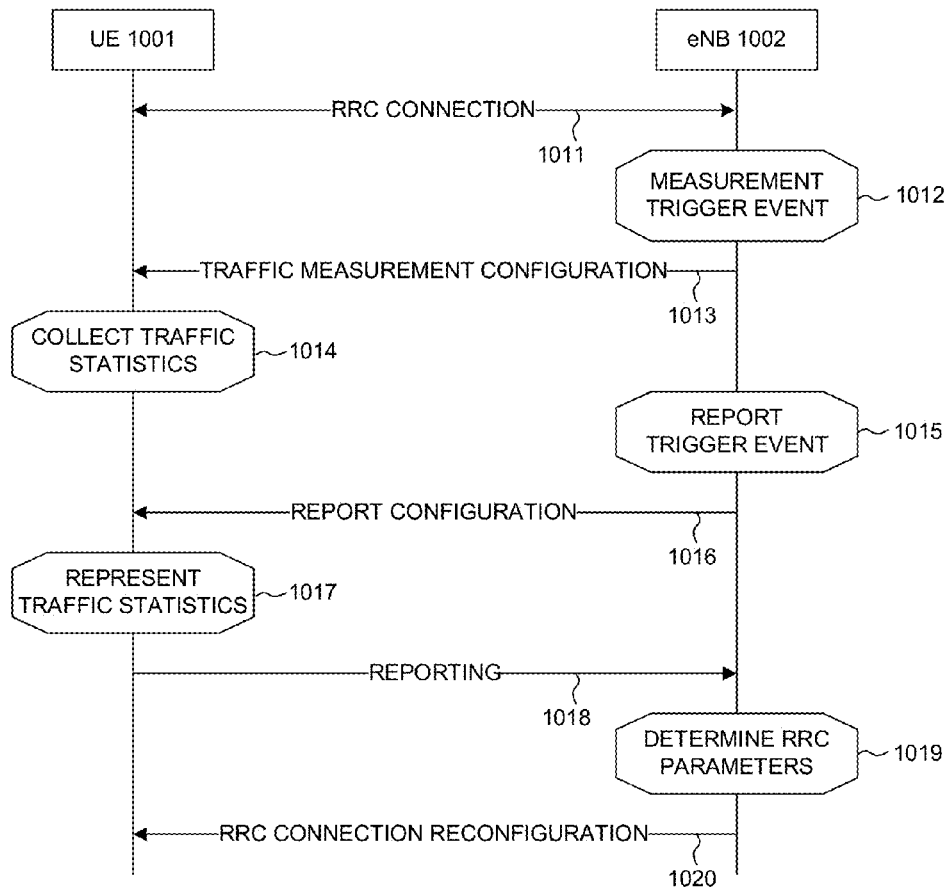
FIG. 10 illustrates a first embodiment of eNodeB-oriented traffic statistics.

FIG. 10 illustrates a first embodiment of eNB-oriented traffic statistics. In step 1011, UE 1001 and eNB 1002 establish an RRC connection. In step 1012, eNB 1002 detects a trigger event for measurement configuration. Traffic measurements and statistics collection is not performed all the time. To reduce unnecessary resource usage and signaling overhead, traffic statistics should be triggered based on certain conditions, e.g., a trigger event. For example, eNB may configure traffic measurements when 1) establish an RRC connection toward UE, 2) loading condition is over a threshold, 3) receive a request from the Core Network or from upper layer (NAS), 4) want to utilize radio resources (especially for SR allocation), and 5) receive indication of frequent RLF/HO failures (related to DRX cycle) from UE.

Upon detecting the trigger event, in step 1013, eNB 1002 sends a traffic measurement configuration to UE 1001. The measurement configuration contains measurement ID, measurement object, and reporting type. The measurement ID contains one ID for measurement object plus reporting type. The measurement object specifies what type of traffic (e.g., DL and/or UL, specific application) shall be collected and what type of statistics (e.g., packet inter-arrival time CDF/PDF, packet size CDF/PDF) shall be generated. The reporting type specifies whether periodic reporting or event trigger reporting is used.

In step 1014, UE 1001 performs traffic measurements and collects traffic statistics according to the received measurement configuration. For periodic reporting, UE 1001 reports the collected traffic statistics periodically. PUCCH may be used and eNB could indicate what PUCCH would be allocated for the reporting. In addition, delta reporting is allowed. For example, UE 1001 reports the difference between previous reporting. For event trigger reporting, in step 1015, eNB 1002 detects a trigger event for requesting traffic statistics report. For example, eNB 1002 may aggressively request the report when 1) QCI is satisfied well and eNB would like to have more optimization on UE power, 2) want to tick off some UEs to avoid loading overload, 3) receive a request from CN or from upper layer, 4) resource utilization is urgent, and 5) want to reduce RLF/HO failures. When reporting, UE 1001 may further indicate what kind of event is triggered.

Upon detecting the trigger event, in step 1016, eNB 1002 sends a report configuration to UE 1001. In step 1017, UE 1001 determines how to represent the traffic statistics in the report. In step 1018, UE 1001 reports the traffic statistics to eNB 1002. In step 1019, eNB 1002 determines RRC parameters based on the representation results. Finally, in step 1020, eNB 1002 performs RRC reconfiguration for the newly determined RRC parameters (e.g., DRX timer and RRC releases timer).

Figure 11:
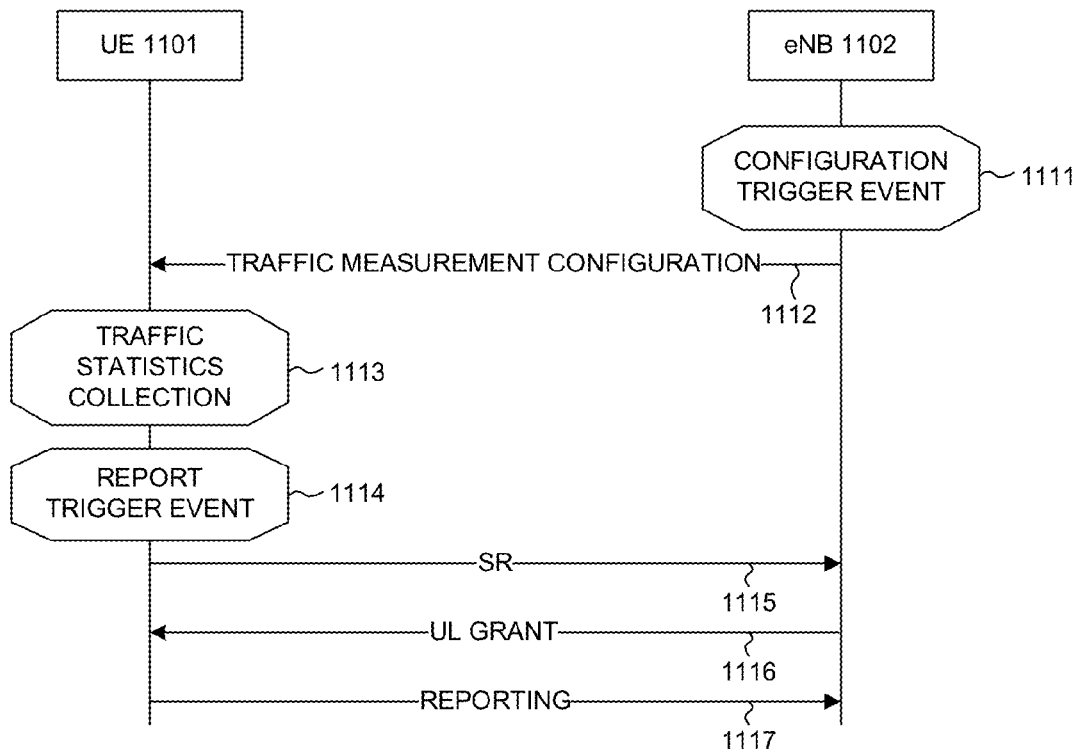
FIG. 11 illustrates a second embodiment of eNodeB-oriented traffic statistics.

FIG. 11 illustrates a second embodiment of eNodeB oriented traffic statistics. Similar to FIG. 10, the traffic statistics is triggered by eNB 1102 (step 1111), which sends a traffic measurement configuration to UE 1101 in step 1112. In step 1113, UE 1101 starts traffic measurement and statistics collection. Unlike FIG. 10, the reporting in FIG. 11 is triggered by UE 1101 (step 1114). If there is simultaneous data transmission, then the report is appended in the uplink transmission. If no data is scheduled for transmission, then in step 1115, UE 1101 sends an SR to eNB 1102. In step 1116, UE 1101 receives an UL grant and reports the traffic statistics to eNB 1102 (step 1117).

Figure 12:
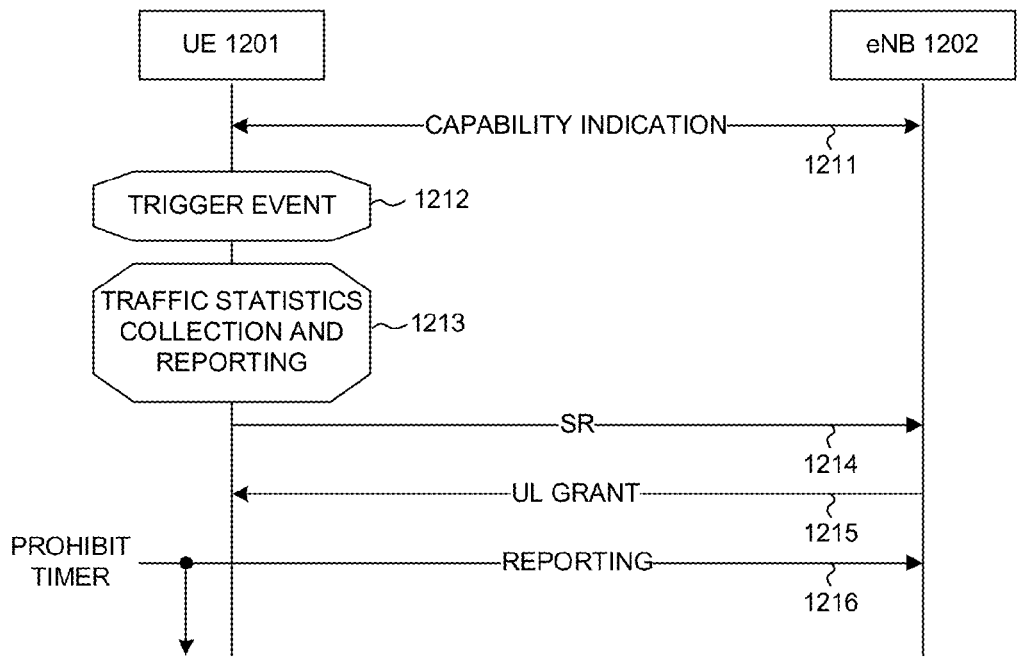
FIG. 12 illustrates a UE-oriented traffic statistics triggering and reporting.

FIG. 12 illustrates a UE oriented traffic statistics triggering and reporting. In step 1211, UE 1201 and eNB 1202 perform capability negotiation. For example, UE 1201 may indicate to eNB 1202 the possibility of sudden traffic statistics report. In step 1212, UE 1201 detects a trigger event for statistics collection and reporting. UE 1201 may initiate statistics collection and report results autonomously when 1) UE finds DRX performance is not good (e.g., DRX cycle is too long or too short), 2) UE wants to offload its data to other transmission modem, 3) UE wants to create long gap (DRX cycle) to support D2D or other special discovery, 4) UE screen ON/OFF is frequent, 5) UE battery level has reached a threshold, 6) a specific application is running on UE, and 7) UE has manual setting to perform the statistics. In step 1203, UE 1201 performs traffic measurements and collects traffic statistics. In step 1214, UE 1201 sends an SR to eNB 1202. In step 1215, UE 1201 receives an UL grant and reports the traffic statistics to eNB 1202 (step 1216). When reporting, UE 1201 may further indicate what kind of event is triggered. To prevent excessive signaling, a prohibit timer is also needed. For example, UE 1201 starts the prohibit timer whenever it reports the traffic statistics.

Traffic statistics such as packet inter-arrival time statistics may be reported as CDF/PDF, which may contain a lot of information. Instead of reporting the complete CDF/PDF to eNB, eNB could request only partial information that eNB is interested in. The requested information should be highly related to RRC configuration parameters, e.g., DRX parameters and RRC release time. For example, eNB-initiated reporting is preferred (as compared to periodic reporting or event trigger reporting) because eNB could configure the form of the statistics report and UE could collect statistics and prepare the report based on the configuration. Various approaches are proposed to represent a CDF curve of statistics result (e.g., x-axis is the packet inter-arrival time, and y-axis is the accumulative packet probability). In addition, PDF graph (e.g., x-axis is the packet inter-arrival time, and -axis is the packet amount) may also be represented for traffic statistics reporting.

Figure 13A:
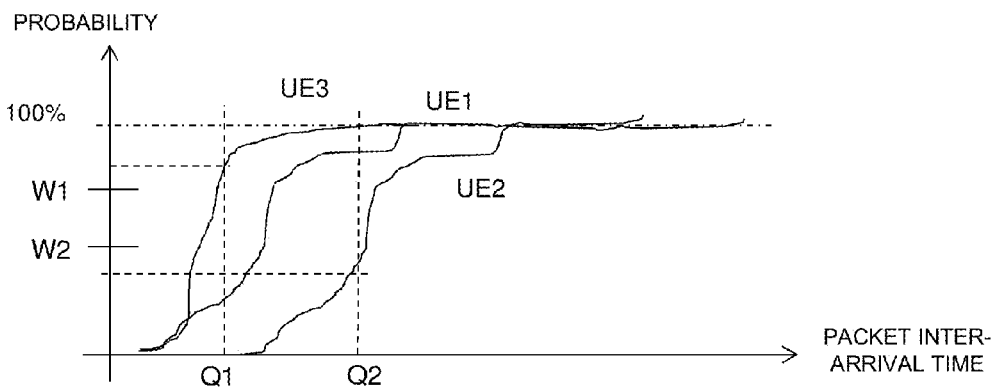
FIG. 13A illustrates a first embodiment of packet inter-arrival time statistics representation.

FIG. 13A illustrates a first embodiment of packet inter-arrival time statistics representation—interesting point representation. In this embodiment, eNB specifies what inter-arrival time value (CDF x-axis) it is interested and UE only reports the probability value (CDF y-axis) for that point. For example, eNB specifies packet inter-arrival time values Q1 and Q2, and UE1, UE2, UE3 each reports the packet probability of the two points. The interesting points may be decision points of RRC timers. Based on the reported probability, eNB can make decision accordingly. For example, if reported probability at Q1>W1, eNB may interpret most packets are concentrated with small inter-arrival time (e.g., UE3). As a result, a short DRX cycle operation is appropriate (eNB extends the drxShortCycle timer to Q1 for achieving this behavior). In another example, if reported probability at Q2<W2, eNB may interpret most packets are dispensed and isolated (e.g., UE2), then sending UE2 to idle is appropriate (eNB shortens the RRC release timer to Q2 for achieving this behavior). Note alternatively, UE may report the inter-arrival time representing X % in the CDF curve, where X is configured by eNB.

Figure 13B:
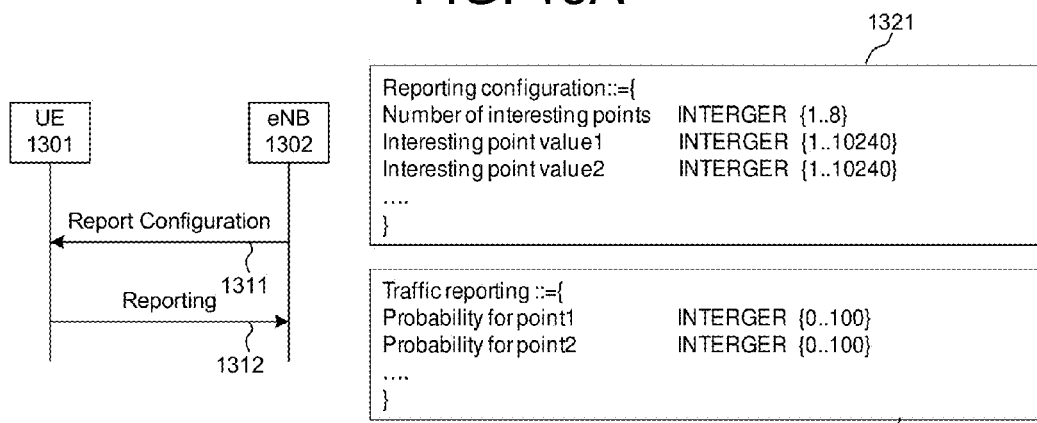
FIG. 13B illustrates a packet inter-arrival time statistics report configuration for interesting point representation.

FIG. 13B illustrates a packet inter-arrival time statistics report configuration using interesting point representation. In step 1311, eNB 1302 sends a reporting configuration to UE 1301. In response, UE 1301 sends a traffic report back to eNB 1302. The reporting configuration (box 1321) contains the number of interesting points, and the value of each interesting point. The traffic report (box 1322) contains the probability for each interesting point. The interesting point representation is simple. However, the report only provides hints to RRC timers, and eNB does not know what values are optimized for the RRC timers. In addition, the representation may miss some traffic burst information since the probability is cumulative. For example, the slope of the CDF curve may carry useful information, but the slope cannot be represented in this approach.

Figure 14A:
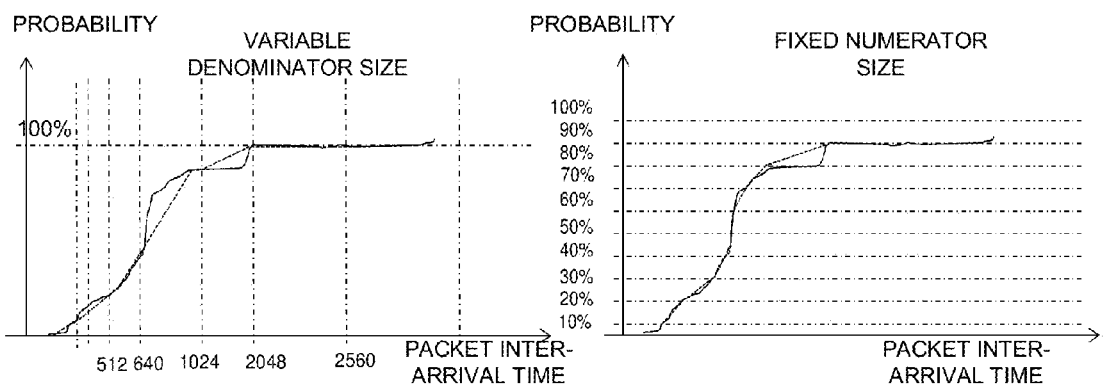
FIG. 14A illustrates a second embodiment of packet inter-arrival time statistics representation.

FIG. 14A illustrates a second embodiment of packet inter-arrival time statistics representation—slope representation. In general, the slope (y-axis/x-axis) of a CDF curve provides the percentage of packets that are under the range of packet inter-arrival time. Thus, the slope may be used to provide burst information. Steep slope means a huge packet amount has similar packet inter-arrival time. If the packet inter-arrival time is small and has high percentage, then it indicates an intra-burst traffic. If the packet inter-arrival time is big and has high percentage, then it indicates an inter-burst traffic. On the other hand, flat slope means a small packet amount are transmitted and its arrival time may be diverse. Those packets may be excluded when making configuration decisions since it is a special case.

In general, UE may use several slopes to construct an approximated CDF curve representation. The slope may use a variable denominator size (see the left diagram in FIG. 14A) or use a fixed numerator size (see the right diagram in FIG. 14A). The fixed numerator size means a fixed probability. The variable denominator size means each slope has a different inter-arrival time range (e.g., using the specified DRX value to see the probability). For example, eNB may compare the slopes to set the DRX cycle. The steepest slope may be the appropriate DRX cycle. The slope could be further quantized to reduce the required information bits.

Figure 14B:
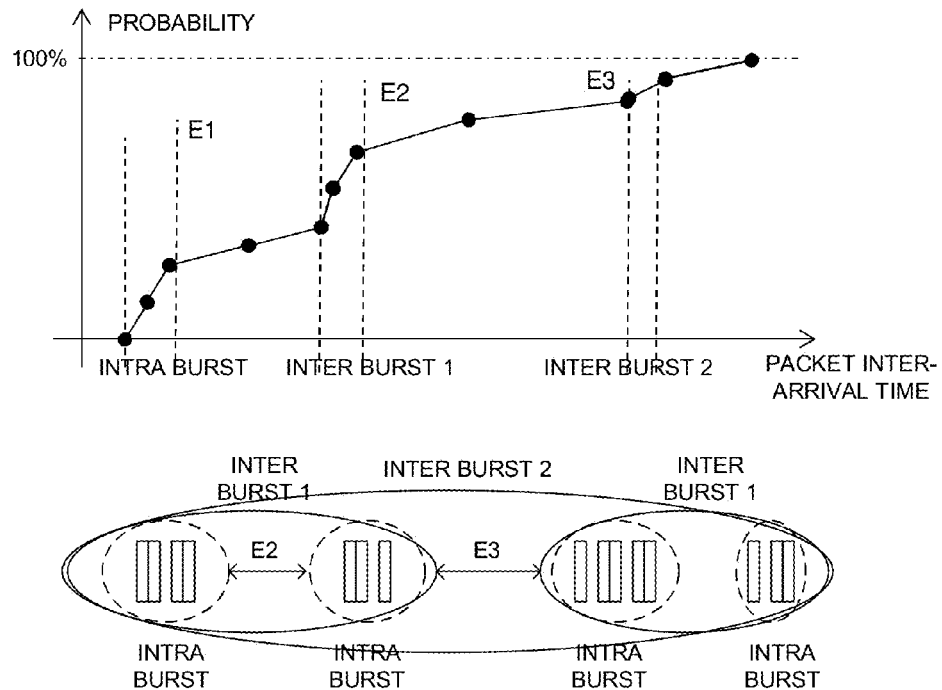
FIG. 14B illustrates how slope representation can be used to determine RRC parameters.

FIG. 14B illustrates how slope representation can be used to determine RRC parameters. In the example of FIG. 14B, E1 represents the packet inter-arrival time for a first slope (intra-burst), E2 represents the packet inter-arrival time for a second slope (inter-burst 1), and E3 represents the packet inter-arrival time for a third slope (inter-burst 2). With slope representation, eNB may understand traffic burst information by comparing with pre-defined threshold. If there is an intra-burst, it means eNB shall carefully configure DRX Inactivity Timer (make it longer, e.g., similar to E1 value in FIG. 14B). If inter-burst has big interval/burst inter-arrival time, then eNB can set shorter RRC release timer (e.g., shorter than E3 value) in that case. If the inter-burst has small interval, then eNB can keep UE in connection (set RRC release timer as longer than E2) and long DRX may be appropriate.

Figure 14C:
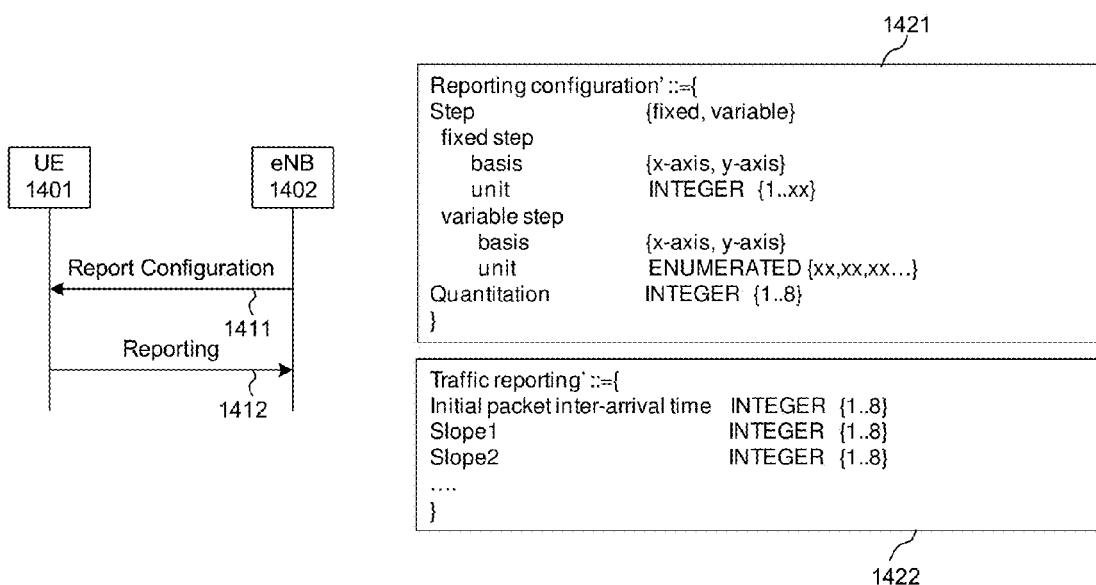
FIG. 14C illustrates a packet inter-arrival time statistics report configuration for slope representation.

FIG. 14C illustrates a packet inter-arrival time statistics report configuration using slope representation. In step 1411, eNB 1402 sends a reporting configuration to UE 1401. In response, UE 1401 sends a traffic report back to eNB 1402. The reporting configuration (box 1421) specifies fixed or variable step, the basis and unit of the steps, and quantization. The traffic report (box 1422) contains the initial packet inter-arrival time, and slope values of the steps. The slope representation can help eNB identify burst information and provide values for setting RRC timers. It requires more information bits and the accuracy is not stable because the scale of packet inter-arrival time and the quantization levels would influence performance.

Figure 15A:
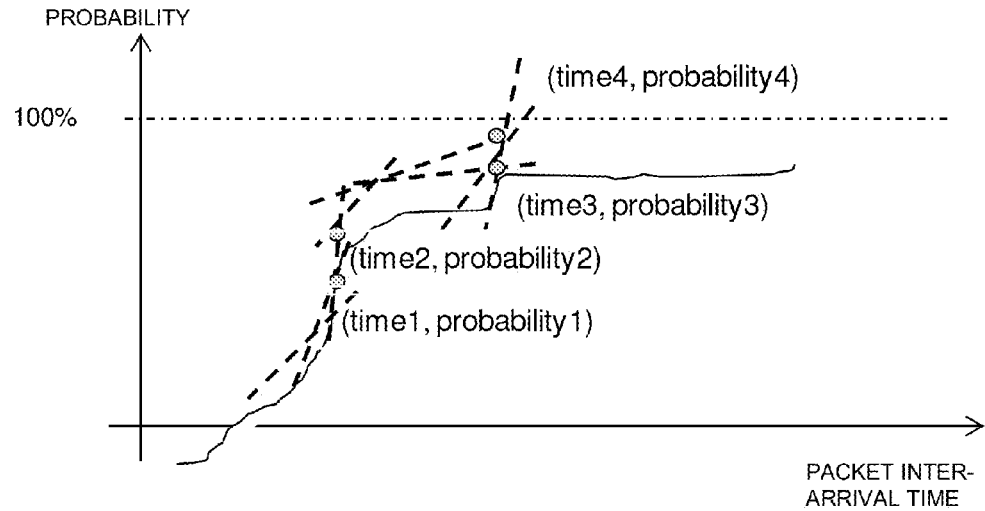
FIG. 15A illustrates a third embodiment of packet inter-arrival time statistics representation.

FIG. 15A illustrates a third embodiment of packet inter-arrival time statistics representation—steep event representation. Considering most packet inter-arrival time in a CDF curve is flat, those slope values would be close to zero and are redundant representation. On the other hand, steep information is very important for determining RRC transition and DRX configuration. Steep information could show burst traffic. A steep event always has a large differential value and the differential calculus can be performed with a small fixed x-axis (e.g., 10 ms). The steep event can be specified by eNB using different methods. In a first example (E-A), eNB provides a steep threshold. If the differential value is above the threshold, then UE represents that point with its packet inter-arrival time and probability. In a second example (E-B), eNB requests several top steep points (e.g., top three points). UE performs the differential calculation among the CDF curve and makes sorting to find out the top three points, and then represents those top three points with inter-arrival time and probability. In a third example (E-C), eNB provides a steep threshold and a timer. If the differential value is above the steep threshold and continued for the timer period, then UE represents that range to eNB (packet inter-arrival time range, probability range). In the example of FIG. 15A, assume four points cross the threshold and the timer is 20 ms, then UE reports all four pairs under E-A, top three pairs under E-B, and two ranges under E-C (time2–time1, probability2–probability1).

Figure 15B:
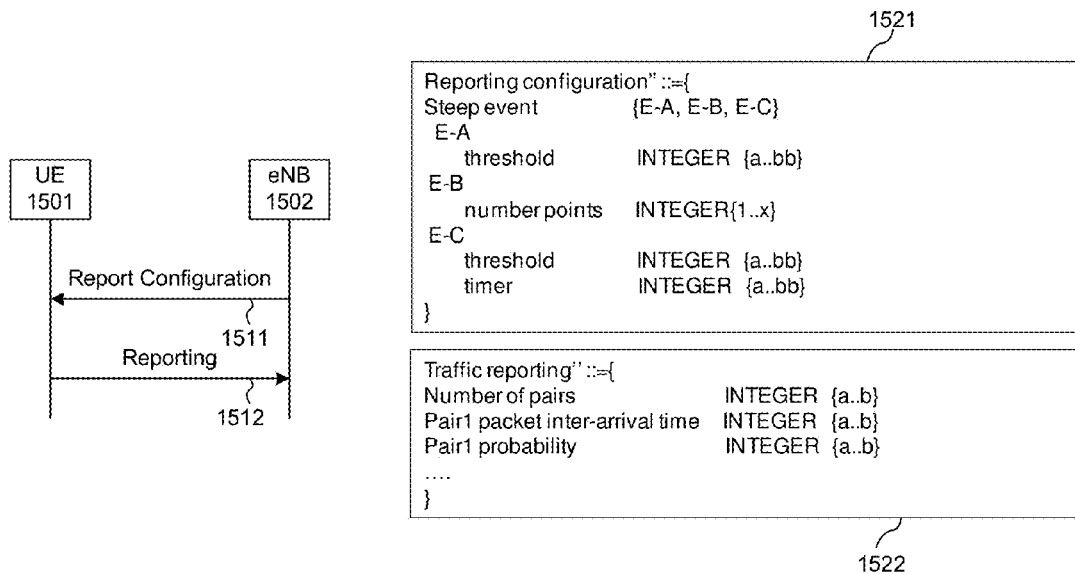
FIG. 15B illustrates a packet inter-arrival time statistics report configuration for steep event representation.

FIG. 15B illustrates a packet inter-arrival time statistics report configuration using steep event representation. In step 1511, eNB 1502 sends a reporting configuration to UE 1501. In response, UE 1501 sends a traffic report back to eNB 1502. The reporting configuration (box 1521) specifies a threshold (E-A), or number of steep points (E-B), or a threshold plus a timer (E-C). The traffic report (box 1522) contains the number of reported pairs, and the packet inter-arrival time and probability for each pair. Steep event representation is a preferred embodiment because steep event representation can help eNB to identify traffic burst information with limited reporting bits.

Figure 16A:
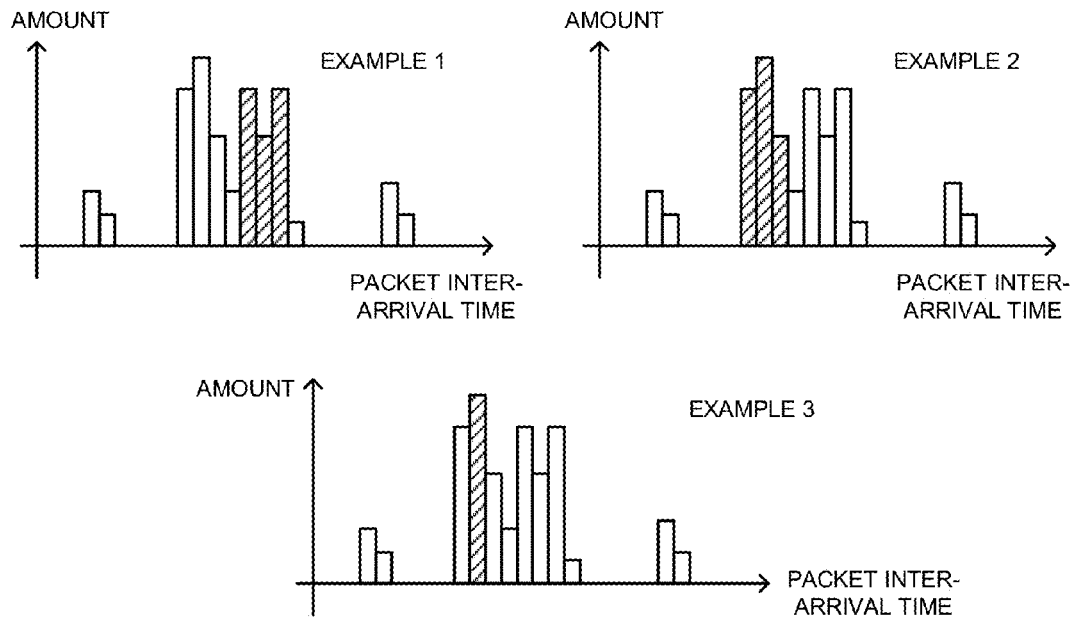
FIG. 16A illustrates a fourth embodiment of packet inter-arrival time statistics representation.

FIG. 16A illustrates a fourth embodiment of packet inter-arrival time statistics representation—PDF range representation. PDF may be valid information to facilitate configuration for DDA. PDF range refers how many packets are in the range of packet inter-arrival time and it shows actual packet number on the distribution. The x-axis is a packet inter-arrival time that may be configured by eNB, and the y-axis is the packet amount on that arrival time. There are three ways for PDF range representation. In a first example (E-1), eNB specifies a range of packet inter-arrival time (start value–end value) and UE represents the amount. In a second example (E-2), eNB specifies the range size and then UE seeks the highest amount on PDF and represent the amount within the range (the x-axis for highest amount is the median of the range size). With E-2, eNB may identify the most frequent packet inter-arrival time and see whether it is a special case or there is a lot of burst gathered roughly in that range. Thus, eNB may set RRC timer based on the most frequent packet inter-arrival time if it neighboring packet inter-arrival time still have high amount. In a third example (E-3), eNB specifies an amount threshold and UE seeks the highest amount on PDF with a smallest packet inter-arrival time range (start value and end value), which the cumulative packet amount is over the threshold.

Figure 16B:
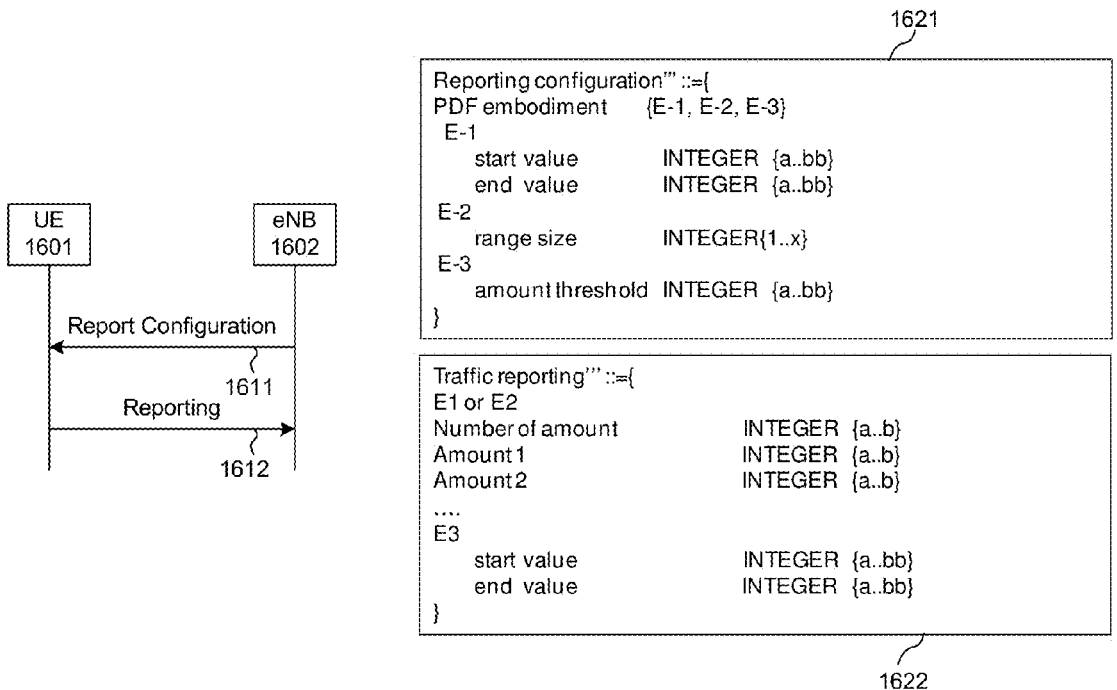
FIG. 16B illustrates a packet inter-arrival time statistics report configuration for PDF range representation.

FIG. 16B illustrates a packet inter-arrival time statistics report configuration using PDF range representation. In step 1611, eNB 1602 sends a reporting configuration to UE 1601. In response, UE 1601 sends a traffic report back to eNB 1602. The reporting configuration (box 1621) specifies a start value and end value (E-1), a range size (E-2), or an amount threshold (E-3). The traffic report (box 1622) contains the number of amount and each amount for E-1 or E-2, or the start value and end value for E-3. The PDF range representation may be able to guarantee eNB to set RRC configuration by observing packet amount from PDF at the cost of UE performing another statistics with increased complexity.

Figure 17:
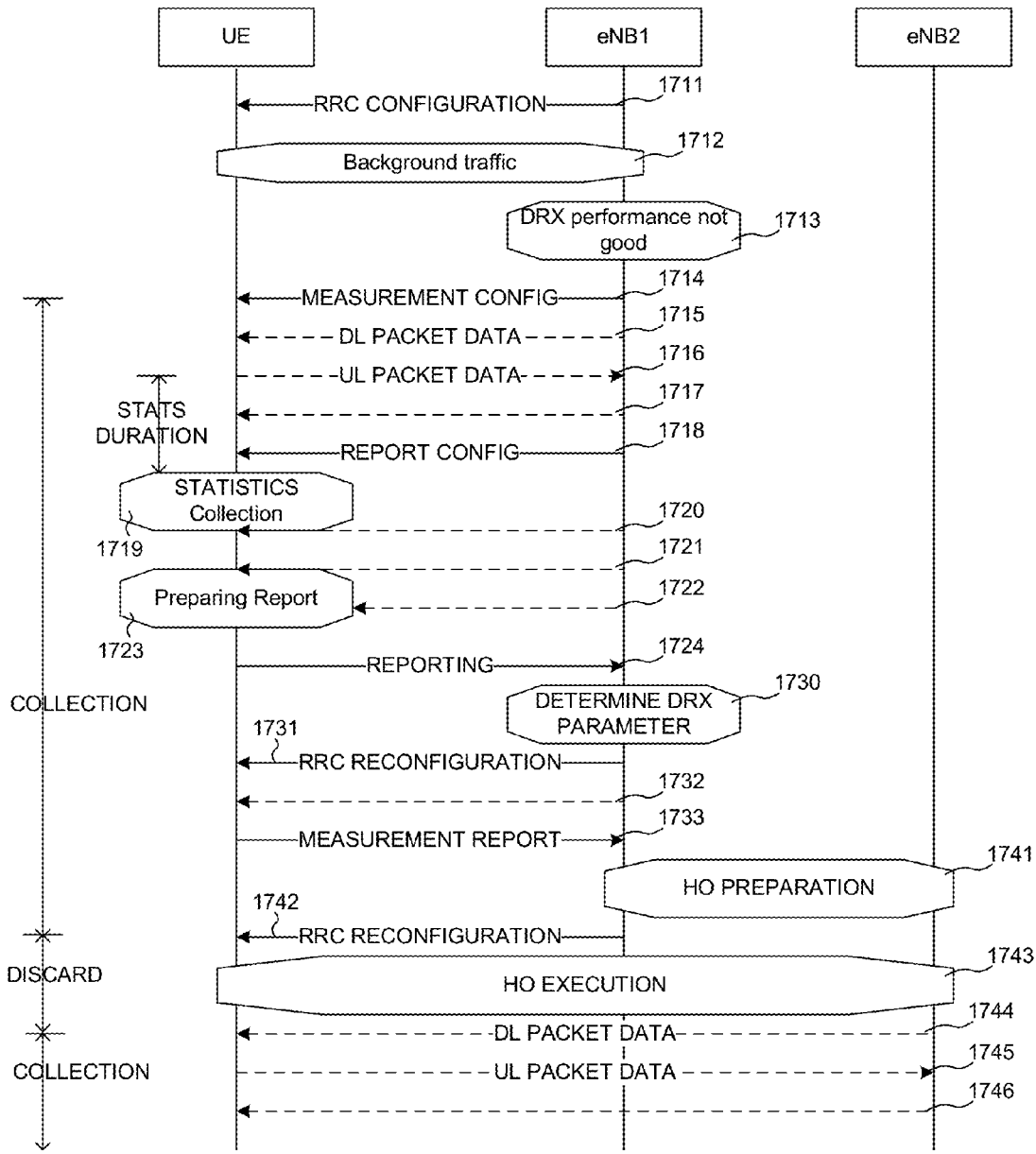
FIG. 17 illustrates one example of a complete procedure of providing traffic statistics to network.

FIG. 17 illustrates one example of a complete procedure of providing traffic statistics to network with preferred embodiments. In step 1711, UE and eNB1 establish an RRC connection. UE may be a Smartphone running certain DDA having background traffic (step 1712). In step 1713, eNB1 determines that DRX performance is not good, and sends out a measurement configuration for traffic statistics in step 1714. UE starts to perform measurements, while UE and eNB1 exchanges downlink and uplink packets (steps 1715-1717). In step 1718, eNB1 sends a report configuration to UE. Accordingly, UE performs stats collection in step 1719 and prepares stats report in step 1723. Meanwhile, UE continues to perform measurements over exchanged data packets (steps 1720-1722). In step 1724, UE reports the traffic statistics to eNB1. Based on the traffic statistics, eNB1 determines DRX parameters (step 1730). In step 1731, eNB1 sends an RRC reconfiguration to UE. UE continues to perform measurements (step 1732). Later on, in step 1733, UE sends a measurement report to eNB1, which starts HO preparation with target eNB2 (step 1741). In step 1742, eNB1 sends RRC reconfiguration including mobility control information to UE. In response, UE suspends traffic statistics collection during HO. In step 1743, UE and eNB2 performs HO execution. After HO, UE establishes RRC connection with eNB2 and exchanges data packets (steps 1744-1746), and resumes traffic statistics collection.

Figure 18:
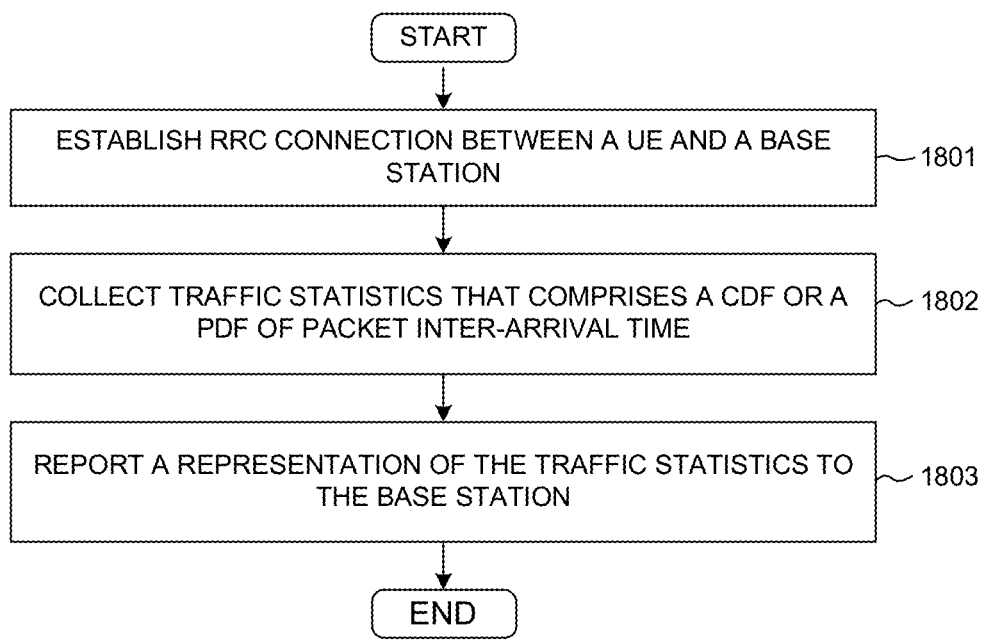
FIG. 18 is a flow chart of a method of collecting and providing traffic statistics in a cellular network in accordance with one novel aspect.

FIG. 18 is a flow chart of a method of collecting and providing traffic statistics in a cellular network in accordance with one novel aspect. In step 1801, a UE establishes an RRC connection with a base station. In step 1802, the UE starts to collect traffic statistics that comprises a CDF curve or a PDF diagram for packet inter-arrival time. The UE may receive a measurement configuration from the base station for the traffic statistics collection. In step 1803, the UE reports a representation of the traffic statistics to the base station. The UE may receive a reporting request from the base station that specifies a representation format. The representation format includes one or more probability values at corresponding inter-arrival time points, at least one slope of the CDF, one or more steep events in the CDF, or a PDF range. In one example, the steep events further comprise assigning at least one threshold to identify the steep events.

Figure 19:
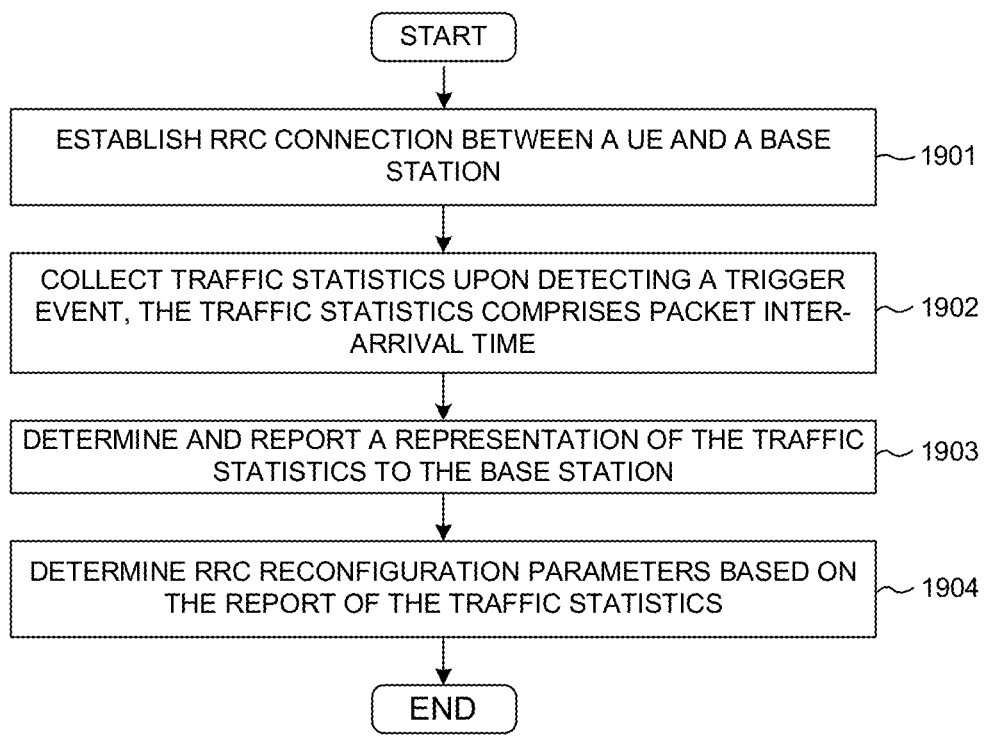
FIG. 19 is a flow chart of a method of triggering and reporting traffic statistics in a cellular network in accordance with one novel aspect.

FIG. 19 is a flow chart of a method of triggering and reporting traffic statistics in a cellular network in accordance with one novel aspect. In step 1901, a UE establishes an RRC connection with a base station. In step 1902, the UE collects traffic statistics upon detecting a trigger event. The traffic statistics comprises packet inter-arrival time. The trigger event may be detected by the UE or by the base station. In step 1903, the UE determines a representation of the traffic statistics and report the result to the base station. The report may be triggered by the UE or by the base station based on another trigger event. In step 1904, the base station determines RRC reconfiguration parameters based on the reported traffic statistics. In one example, DRX timer values are determined based on intra-burst packet inter-arrival time. In another example, RRC release timer is determined based on inter-burst packet inter-arrival time.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a radio resource control (RRC) connection by a user equipment (UE) with a base station in a mobile communication network;
   collecting traffic statistics, wherein the traffic statistics comprises a cumulative distribution function (CDF) or a probability density function (PDF) of packet inter-arrival time, and wherein retransmitted packets are excluded from packet inter-arrival time statistics; and
   reporting a representation of the traffic statistics to the base station.

2. The method of claim 1, further comprising:
   receiving a measurement configuration for packet inter-arrival time statistics or packet size statistics collection from the base station.

3. The method of claim 1, wherein the traffic statistics comprises a first packet inter-arrival time of a plurality of packet intra-bursts and a second packet inter-arrival time of a plurality of packet inter-bursts.

4. The method of claim 3, wherein an intra-burst is a plurality of packets having similar packet inter-arrival time that is smaller than a first predefine value, and wherein an inter-burst is a plurality of packet bursts having packet inter-arrival time that is larger than a second predefined value.

5. The method of claim 1, wherein downlink packets and uplink packets are combined for the packet inter-arrival time statistics.

6. The method of claim 1, wherein the UE suspends collecting the traffic statistics during handover and resumes collecting the traffic statistics after handover.

7. The method of claim 1, wherein packets among all component carriers are combined under carrier aggregation for the packet inter-arrival time statistics.

8. The method of claim 1, wherein the representation includes one or more probability values at corresponding inter-arrival time points, at least one slope of the CDF, one or more steep events in the CDF, or a PDF range.

9. A user equipment (UE), comprising:
   a radio resource control (RRC) module that establishes an RRC connection with a base station in a mobile communication network;
   a statistics collection module that collects traffic statistics upon detecting a triggering condition, wherein the traffic statistics comprises a cumulative distribution function (CDF) or a probability density function (PDF) of packet inter-arrival time, and wherein the traffic statistics comprises a first packet inter-arrival time of a plurality of packet intra-bursts and a second packet inter-arrival time of a plurality of packet inter-bursts; and a statistics reporting module that reports a representation of the traffic statistics to the base station.

10. The UE of claim 9, further comprising:
a receiver that receives a measurement configuration for packet inter-arrival time statistics or packet size statistics collection from the base station.

11. The UE of claim 9, wherein downlink packets and uplink packets are combined for the packet inter-arrival time statistics.

12. The UE of claim 9, wherein the UE suspends collecting the traffic statistics during handover and resumes collecting the traffic statistics after handover.

13. The UE of claim 9, wherein packets among all component carriers are combined under carrier aggregation for the packet inter-arrival time statistics.

14. The UE of claim 9, wherein the representation includes one or more probability values at corresponding inter-arrival time points, at least one slope of the CDF, one or more steep events in the CDF, or a PDF range.

15. A method, comprising:
establishing a radio resource control (RRC) connection by a base station with a user equipment (UE) in a mobile communication network; and
receiving a representation of traffic statistics from the UE, wherein the traffic statistics comprises a cumulative distribution function (CDF) or a probability density function (PDF) of packet inter-arrival time, and wherein the traffic statistics comprises a first packet inter-arrival time of a plurality of packet intra-bursts and a second packet inter-arrival time of a plurality of packet inter-bursts.

16. The method of claim 15, further comprising:
transmitting a measurement configuration to the UE for packet inter-arrival time statistics or packet size statistics collection.

17. The method of claim 16, wherein the measurement configuration specifies a collection period and a sliding size for the traffic statistics.

18. The method of claim 16, wherein the measurement configuration specifies a traffic type to be collected for the traffic statistics.

19. The method of claim 15, further comprising:
transmitting a reporting request to the UE for reporting the representation of the CDF or PDF of the packet inter-arrival time statistics.

20. The method of claim 19, wherein the reporting request specifies a representation format, wherein the representation format includes one or more probability values at corresponding inter-arrival time points, at least one slope of the CDF, one or more steep events in the CDF, or a PDF range.

21. The method of claim 20, wherein the steep events further comprise assigning at least one threshold to identify the steep events.

* * * * *